US008255421B2

(12) United States Patent
Maeda et al.

(10) Patent No.: US 8,255,421 B2
(45) Date of Patent: Aug. 28, 2012

(54) COMMUNICATION ASSISTANCE DEVICE, COMMUNICATION ASSISTANCE METHOD, AND COMMUNICATION ASSISTANCE PROGRAM

(75) Inventors: Shigenori Maeda, Kyoto (JP); Takashi Nishimori, Osaka (JP); Yoichi Ikeda, Osaka (JP); Takahiro Higashimura, Nara (JP)

(73) Assignee: Panasonic Corporation, Osaka (JP)

( * ) Notice: Subject to any disclaimer, the term of this patent is extended or adjusted under 35 U.S.C. 154(b) by 140 days.

(21) Appl. No.: 12/936,034

(22) PCT Filed: Apr. 1, 2009

(86) PCT No.: PCT/JP2009/001540
§ 371 (c)(1),
(2), (4) Date: Oct. 1, 2010

(87) PCT Pub. No.: WO2009/122745

PCT Pub. Date: Oct. 8, 2009

(65) Prior Publication Data
US 2011/0029534 A1 Feb. 3, 2011

(30) Foreign Application Priority Data

Apr. 2, 2008 (JP) .................................. 2008-095617

(51) Int. Cl.
*G06F 17/30* (2006.01)
(52) U.S. Cl. ........ 707/791; 707/706; 707/736; 707/758; 707/781; 707/802
(58) Field of Classification Search ........... 707/600–831
See application file for complete search history.

(56) References Cited

U.S. PATENT DOCUMENTS
2007/0124425 A1* 5/2007 Gross ........................... 709/217

FOREIGN PATENT DOCUMENTS
| JP | 2000-231573 | 8/2000 |
| JP | 2001-92708 | 4/2001 |
| JP | 2001-282687 | 10/2001 |
| JP | 2001-282805 | 10/2001 |
| JP | 2003-223406 | 8/2003 |
| JP | 2005-327105 | 11/2005 |
| JP | 2008-97078 | 4/2008 |

OTHER PUBLICATIONS

International Search Report issued Jun. 2, 2009 in International (PCT) Application No. PCT/JP2009/001540.

(Continued)

*Primary Examiner* — Isaac M Woo
(74) *Attorney, Agent, or Firm* — Wenderoth, Lind & Ponack, L.L.P.

(57) ABSTRACT

A communication assistance device (100) enables smooth and active communication between users, and includes a topic node generation unit (103) that calculates a topic appropriateness value based on the number of pieces of content from which meta information has been extracted or the number of times each piece of content including the meta information has been viewed, and generates a first topic node including the meta information and the topic appropriateness value, an integrated topic node generation unit (104) that obtains first topic nodes for a plurality of users, and generates, for every item of meta information, an integrated topic node storing the topic appropriateness value corresponding to each user, a topic node expansion unit (105) that generates an expanded topic node as a new topic node based on the item of meta information for the integrated topic node, a common-topic-candidate extraction unit (107) that extracts a common topic candidate between the users from the integrated topic node or the expanded topic node, a display unit (108) that displays the common topic candidate, and an input unit (110) that receives input of at least one of the displayed common topic candidates.

13 Claims, 10 Drawing Sheets

OTHER PUBLICATIONS

Haruhiko Hiramatsu et al., "Reconstruction of Contents for Communication in Mobile Environment (Mobile Kankyo ni Okeru Communication Shien no Tameno Content no Saikousei)", IPSJ SIG Notes, Jul. 17, 2002, vol. 2002, No. 67, pp. 115-121 (along with English translation).

Reply filed on Jun. 2009 in International (PCT) Application No. PCT/JP2009/001540.

* cited by examiner

| Upper link | | | • • • | |
|---|---|---|---|---|
| Topic code | 0001 ||||
| Topic name | Railway α ||||
| Topic appropriateness | 60 | – | • • • | – |

COMMUNICATION ASSISTANCE DEVICE, COMMUNICATION ASSISTANCE METHOD, AND COMMUNICATION ASSISTANCE PROGRAM

TECHNICAL FIELD

The present invention relates to a communication assistance device, a method, and a program for extracting a topic of common interest for a group of a plurality of specific users based on meta information about content, and enabling smooth and active communication within the group.

BACKGROUND ART

Conventional communication assistance techniques known in the art enable interpersonal communication between users to be performed smoothly and actively by extracting topics of common interest or by searching for communication partners with whom specific topics of interest can be shared.

With one such technique known in the art, for example, a user can search for an information source having information that the user wants to obtain and a topic in which the user is likely to share the greatest interest with the information source (see, for example, Patent Citations 1 and 2). With another technique known in the art, a user can find out topics that are unrelated to the subject matter of the communication using a list of topics given by the other party of the communication, so that the communication with the other party will be developed (see, for example, Patent Citation 3). With still another technique, pieces of content are collected based on profiles of a user, and an information page consisting of the collected pieces of content is displayed to another user (see, for example, Patent Citation 4). With still another technique, an interest level of a topic common to a transmitter and a receiver of e-mail messages is calculated based on the frequency of transmitted and received e-mail messages, and a user can find a community based on the calculated interest level (see, for example, Patent Citation 5).

Patent Citation 1: Japanese Unexamined Patent Publication No. 2000-231573
Patent Citation 2: Japanese Unexamined Patent Publication No. 2001-282805
Patent Citation 3: Japanese Unexamined Patent Publication No. 2001-282687
Patent Citation 4: Japanese Unexamined Patent Publication No. 2003-223406
Patent Citation 5: Japanese Unexamined Patent Publication No. 2005-327105

DISCLOSURE OF INVENTION

Technical Problem

However, the above conventional techniques have the problems described below, and are flawed particularly when a user wants to find a good topic of communication on which the user can smoothly communicate with new people.

1. Matching is performed only using topics (keywords) included in user's profiles; the techniques fail to provide a mechanism for finding common ground between groups of users participating in communication when users have varying levels and granularity of interest.

2. The techniques fail to consider varying degrees of users' persistence to a topic when evaluating the appropriateness of the topic.

3. The techniques fail to provide sufficient information about relevance of a topic to each user's own interest, which can be used to proceed further communication on the topic.

To solve the above problems, it is an object of the present invention to provide a communication assistance device, a method, and a program for easily and appropriately detecting a topic of common interest for users participating in communication and enabling smooth and active communication between the users.

Technical Solution

A first aspect of the present invention provides a communication assistance device including a meta information extraction unit, a topic node generation unit, an integrated topic node generation unit, a topic node expansion unit, a common-topic-candidate extraction unit, a display unit, and an input unit.

The meta information extraction unit extracts an item of meta information from a piece of content belonging to a user. The topic node generation unit calculates a topic appropriateness value based on the number of pieces of content from which the item of meta information has been extracted or the number of times a piece of content including the item of meta information has been viewed, and generates a first topic node including the item of meta information and the topic appropriateness value. The integrated topic node generation unit obtains the first topic nodes and other topic nodes for a plurality of users, and generates, for every item of meta information, an integrated topic node storing the topic appropriateness value corresponding to each of the plurality of users. The topic node expansion unit generates an expanded topic node that is a new topic node based on the item of meta information corresponding to the integrated topic node. The common-topic-candidate extraction unit extracts at least one common topic candidate between the plurality of users from the integrated topic node or from the expanded topic node. The display unit displays the at least one common topic candidates. The input unit receives input of the at least one common topic candidates displayed.

The topic node expansion unit searches for an item of relevant information that has a semantic relationship falling within a predetermined range with the item of meta information corresponding to at least one integrated topic node. After obtaining the item of relevant information, the topic node expansion unit generates, for the obtained item of relevant information, the expanded topic node that is linked to the at least one integrated topic node. The topic node expansion unit lowers the topic appropriateness value corresponding to each of the plurality of users calculated for the item of meta information in accordance with an inter-item distance between the obtained item of relevant information and the item of meta information corresponding to the integrated topic node to calculate another topic appropriateness value corresponding to each of the plurality of users for the obtained item of relevant information. The topic node expansion unit stores the another topic appropriateness value corresponding to each of the plurality of users calculated for the obtained item of relevant information into the expanded topic node. The topic node expansion unit further generates a new expanded topic node based on another item of relevant information obtained for the generated expanded topic node.

The common-topic-candidate extraction unit calculates a common topic level in accordance with a difference between the topic appropriateness values corresponding to the plurality of users or a ratio of the topic appropriateness values corresponding to the plurality of users that have been calculated for the item of meta information corresponding to the integrated topic node or for the item of relevant information corresponding to the expanded topic node, and extracts the at least one common topic candidate in accordance with the common topic level.

The semantic relationship falling within the predetermined range may be, for example, the relationship of a broader concept and a narrower concept. The inter-item distance may be, for example, a quantitative expression of a semantic relationship between items of information. Generating the expanded topic node not only refers to newly generating an expanded topic node, but also may include linking an integrated topic node or an expanded topic node to the existing expanded topic node and adding a topic appropriateness value newly calculated for each user to the existing expanded topic node or updating the topic appropriateness values stored in the existing expanded topic node. Generating the new expanded topic node based on the item of relevant information obtained for the generated expanded topic node may also include repeatedly generating an expanded topic node based on an item of relevant information obtained for an expanded topic node.

This structure enables each user participating in communication to easily find a topic of common interest between the plurality of users, and enables smooth and active communication between the users.

A second aspect of the present invention provides the communication assistance device of the first aspect of the present invention in which the topic node expansion unit calculates the topic appropriateness value TF(i) for the item of relevant information using the formula below:

$$TF(i) = \sum_{j=1}^{n} \frac{TF(j)}{(D(i,j)+1)^2}$$

where TF(j) is a topic appropriateness value corresponding to each of the plurality of users for the item of meta information or for the item of relevant information that is to be lowered, and D(i, j) is the inter-item distance.

A third aspect of the present invention provides the communication assistance device of the first aspect of the present invention in which the common-topic-candidate extraction unit calculates the common topic level T(i) using the formula below:

$$T(i) = \frac{E(i)}{V(i)+1}$$

where E(i) is a mean value of the topic appropriateness values corresponding to the plurality of users, and V(i) is a variance of the topic appropriateness values corresponding to the plurality of users.

A fourth aspect of the present invention provides the communication assistance device of the first aspect of the present invention in which the display unit displays, for each of the at least one common topic candidate, a distribution of the topic appropriateness values corresponding to the plurality of users and the item of meta information of the first topic node for which the at least one common topic candidate has been extracted.

A fifth aspect of the present invention provides the communication assistance device of the first aspect of the present invention further including a topic/content sharing unit that extracts a piece of content including the item of meta information corresponding to the integrated topic node from which the input common topic candidate has been extracted, and controls the extracted piece of content to be shared by the plurality of users.

This structure enables pieces of content relevant to the topic of common interest to be shared by the plurality of users, and enables the users to communicate with one another smoothly while allowing each user to use such pieces of content.

A sixth aspect of the present invention provides the communication assistance device of the first aspect of the present invention in which the topic node expansion unit further calculates the inter-item distance between the item of meta information and the item of relevant information or between the items of relevant information based on a semantic relation between the items defined in a dictionary.

A seventh aspect of the present invention provides the communication assistance device of the first aspect of the present invention in which the topic node expansion unit further calculates an inter-item distance between an item of meta information and an item of relevant information or between the items of relevant information based on a co-occurrence frequency of the items with respect to the piece of content.

An eighth aspect of the present invention provides the communication assistance device of the first aspect of the present invention in which the display unit displays a distribution of the topic appropriateness values corresponding to the plurality of users for the at least one common topic candidate using at least one of a character, a numerical value, a symbol, and a graph.

A ninth aspect of the present invention provides the communication assistance device of the first aspect of the present invention in which the display unit displays a distribution of the topic appropriateness values corresponding the plurality of users for the at least one common topic candidate by changing at least one of a component or a shade of gray of a displayed color, a display size, and a display shape.

A tenth aspect of the present invention provides the communication assistance device of the first aspect of the present invention in which the display unit displays the common topic candidates in a list or using a graph in an order of higher common topic levels.

An eleventh aspect of the present invention provides the communication assistance device of the first aspect of the present invention further including a topic appropriateness updating unit that recalculates a further topic appropriateness value for the at least one common topic candidate input by the input unit.

A twelfth aspect of the present invention provides a communication assistance method including:

(a) extracting an item of meta information from a piece of content belonging to a user;

(b) calculating a topic appropriateness value based on the number of pieces of content from which the item of meta information has been extracted or the number of times a piece of content including the item of meta information has been viewed, and generating a first topic node including the item of meta information and the topic appropriateness value;

(c) obtaining the first topic node and other first topic nodes for a plurality of users, and generating, for every item of meta information, an integrated topic node storing the topic appropriateness value corresponding to each of the plurality of users;

(d) generating as an expanded topic node that is a new topic node based on the item of meta information corresponding to the integrated topic node;

(e) extracting at least one common topic candidate between the plurality of users from the integrated topic node or from the expanded topic node;

(f) displaying the at least one common topic candidate; and (g) receiving input of the at least one of the common topic candidate displayed.

The (d) includes:

(d-1) searching for an item of relevant information that has a semantic relationship falling within a predetermined range with the item of meta information corresponding to at least one integrated topic node;

(d-2) generating, after obtaining the item of relevant information, the expanded topic node for the obtained item of relevant information, the expanded topic node being linked to the at least one integrated topic node;

(d-3) lowering the topic appropriateness value corresponding to each of the plurality of users calculated for the item of meta information in accordance with an inter-item distance between the obtained item of relevant information and the item of meta information corresponding to the integrated topic node to calculate another topic appropriateness value corresponding to each of the plurality of users for the obtained item of relevant information;

(d-4) storing the another topic appropriateness value corresponding to each of the plurality of users calculated for the obtained item of relevant information; and (d-5) further generating a new expanded topic node based on another item of relevant information obtained for the generated expanded topic node.

The (e) includes:

(e-1) calculating a common topic level in accordance with a difference between the topic appropriateness values corresponding to the plurality of users or a ratio of the topic appropriateness values corresponding to the plurality of users that have been calculated for the item of meta information corresponding to the integrated topic node or for the item of relevant information corresponding to the expanded topic node;

(e-2) extracting the at least one common topic candidate in accordance with the common topic level.

A thirteenth aspect of the present invention provides a communication assistance program for enabling a computer to implement:

(a) extracting an item of meta information from a piece of content belonging to a user;

(b) calculating a topic appropriateness value based on the number of pieces of content from which the item of meta information has been extracted or the number of times a piece of content including the item of meta information has been viewed, and generating a first topic node including the item of meta information and the topic appropriateness value;

(c) obtaining the first topic node and other first topic nodes for a plurality of users, and generating, for every item of meta information, an integrated topic node storing the topic appropriateness value corresponding to each of the plurality of users;

(d) generating as an expanded topic node that is a new topic node based on the item of meta information corresponding to the integrated topic node;

(e) extracting at least one common topic candidate between the plurality of users from the integrated topic node or from the expanded topic node;

(f) displaying the at least one common topic candidate; and (g) receiving input of the at least one common topic candidate displayed.

The (d) includes:

(d-1) searching for an item of relevant information that has a semantic relationship falling within a predetermined range with the item of meta information corresponding to at least one integrated topic node;

(d-2) generating, after obtaining the item of relevant information, the expanded topic node for the obtained item of relevant information, the expanded topic node being linked to the at least one integrated topic node;

(d-3) lowering the topic appropriateness value corresponding to each of the plurality of users calculated for the item of meta information in accordance with an inter-item distance between the obtained item of relevant information and the item of meta information corresponding to the integrated topic node to calculate another topic appropriateness value corresponding to each of the plurality of users for the obtained item of relevant information;

(d-4) storing the another topic appropriateness value corresponding to each of the plurality of users calculated for the obtained item of relevant information; and (d-5) further generating a new expanded topic node based on another item of relevant information obtained for the generated expanded topic node.

The (e) includes:

(e-1) calculating a common topic level in accordance with a difference between the topic appropriateness values corresponding to the plurality of users or a ratio of the topic appropriateness values corresponding to the plurality of users that have been calculated for the item of meta information corresponding to the integrated topic node or for the item of relevant information corresponding to the expanded topic nodes; and (e-2) extracting the at least one common topic candidate in accordance with the common topic level.

Advantageous Effects

The communication assistance device of the present invention easily and appropriately detects a topic of common interest for users participating in communication, and enables smooth and active communication between the users.

BRIEF DESCRIPTION OF DRAWINGS

FIG. 2 shows the data structure of a topic node used in the first embodiment.

BEST MODE FOR CARRYING OUT THE INVENTION

Embodiments of the present invention will now be described with reference to the drawings.

1. First Embodiment 1.1 Structure of Communication Assistance Device 100

Figure 1:
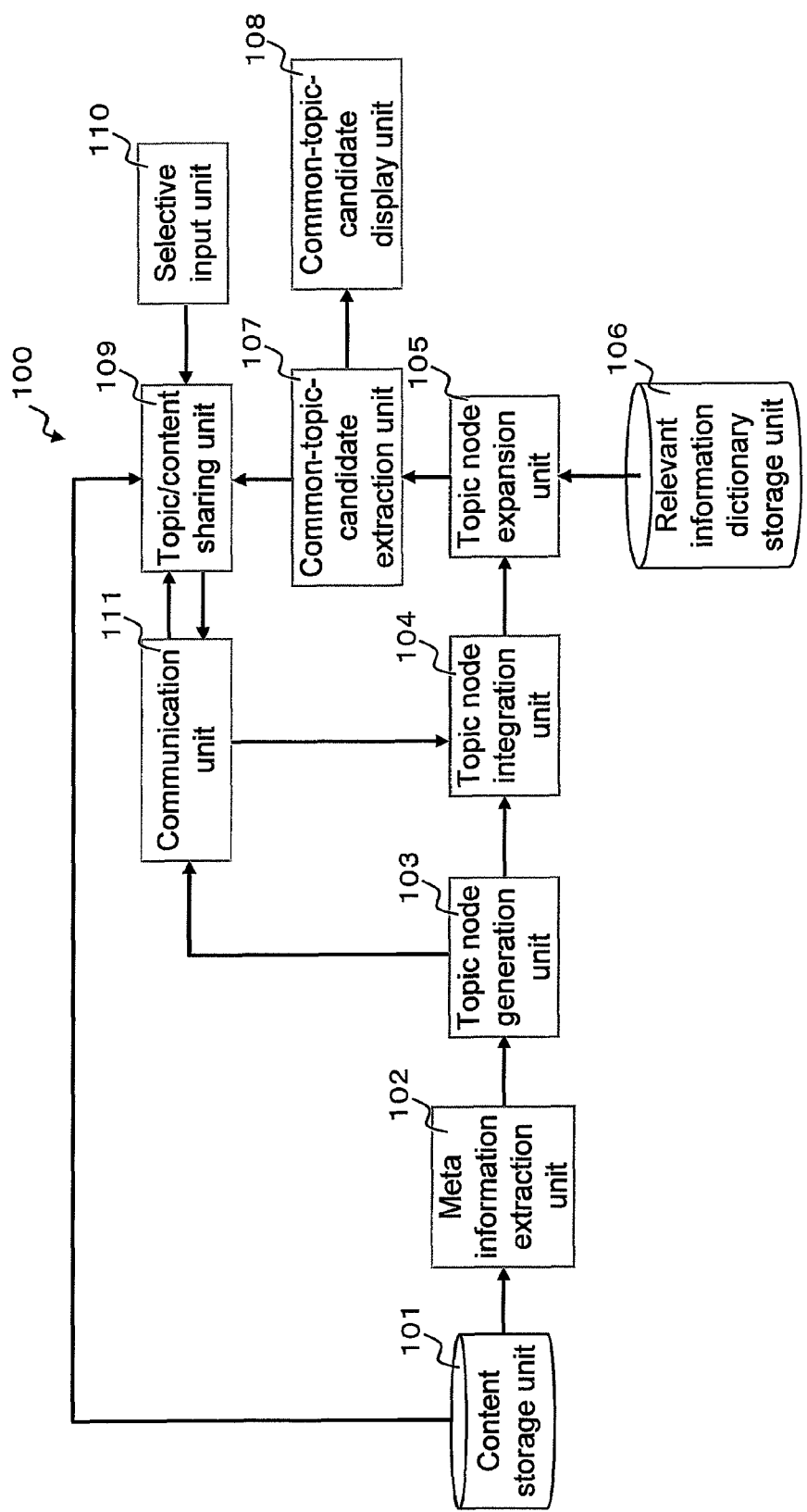
FIG. 1 is a schematic block diagram of a communication assistance device according to a first embodiment of the present invention.

FIG. 1 is a block diagram of a communication assistance device 100 according to a first embodiment of the present invention.

In FIG. 1, the communication assistance device 100 includes a content storage unit 101, a meta information extraction unit 102, a topic node generation unit 103, a topic node integration unit (integrated topic node generation unit) 104, a topic node expansion unit 105, a common-topic-candidate extraction unit 107, a common-topic-candidate display unit (display unit) 108, a topic/content sharing unit 109, a selective input unit (input unit) 110, and a communication unit 111.

The communication assistance device 100 is formed by, for example, a device that generates, accumulates, and uses pieces of personal content, such as a mobile AV terminal, and may specifically be, for example, a mobile telephone or a digital still camera.

The meta information extraction unit 102, the topic node generation unit 103, the topic node integration unit 104, the topic node expansion unit 105, the common-topic-candidate extraction unit 107, the common-topic-candidate display unit 108, and the topic/content sharing unit 109 perform their operations (described later), which are implemented by a central processing unit (CPU) of the communication assistance device 100 reading and executing programs (not shown) stored in a storage unit, such as a read-only memory (ROM) or an external memory. The selective input unit 110 is formed by an input interface, such as a touch button or an operation key. The communication unit 111 is formed by a communication interface. Each of the content storage unit 101 and the relevant information dictionary storage unit 106 is formed by a storage unit, such as an external memory. All or part of the storage units may be arranged inside the device 100, or may be externally connected to the device 100. Alternatively, all or part of these storage units may be arranged in a storage device that can be accessed via a network.

1.2 Operation of Communication Assistance Device 100

The operation of the communication assistance device 100 according to the present embodiment will now be described.

The communication assistance device 100 collects common items of meta information from pieces of content belonging to the user of the communication assistance device 100 and pieces of content belonging to users of other communication assistance devices that can communicate with the communication assistance device 100. The communication assistance device 100 then extracts topics of common interest (common topics) based on the collected items of meta information, and displays the extracted common topics.

The content storage unit 101 stores pieces of content created or collected by the user. The user is assumed to preliminarily set pieces of content that can be shared with other users.

The meta information extraction unit 102 extracts an item of meta information attached to each piece of content belonging to the user, and inputs the extracted item of meta information into the topic node generation unit 103. The meta information is information about content, and for example, each item of meta information may indicate the attribute of the corresponding piece of content.

The topic node generation unit 103 calculates, for every item of meta information extracted by the meta information extraction unit 102, a value indicating a topic appropriateness (topic appropriateness value) corresponding to each user based on the number of pieces of content including the extracted item of meta information or the number of times such pieces of content including the extracted item of meta information have been viewed. The topic node generation unit 103 further generates a topic node (first topic node) storing the extracted item of meta information and the calculated topic appropriateness value, and registers each generated topic node together with an assigned topic code, which will be described later.

The topic appropriateness value is specifically an evaluation value indicating an interest level of the corresponding user for the topic, or in other words, indicating the likelihood of the corresponding user being able to actively talk about the topic. To generate the first topic node, the topic appropriateness value is calculated by, for example, adding the number of pieces of content including the extracted item of meta information and the total number of times each of such pieces of content is viewed during a predetermined period of time.

FIG. 2 shows an example of the data structure of the topic node used in the present embodiment. The "upper link" field indicates a storage position of link information, which shows a link from this topic node to another topic node that is relevant to this topic node. The link method will be described later. The "topic code" functions as an index uniquely assigned to the topic node. The "topic name" field stores either meta information representing this topic node or its relevant information.

All topic nodes generated by the topic node generation unit 103 (hereafter referred to as a "topic node set") are input into each of the topic node integration unit 104 and the communication unit 111. The topic node set input into the communication unit 111 is transmitted to another user participating in the same communication.

Figure 3:
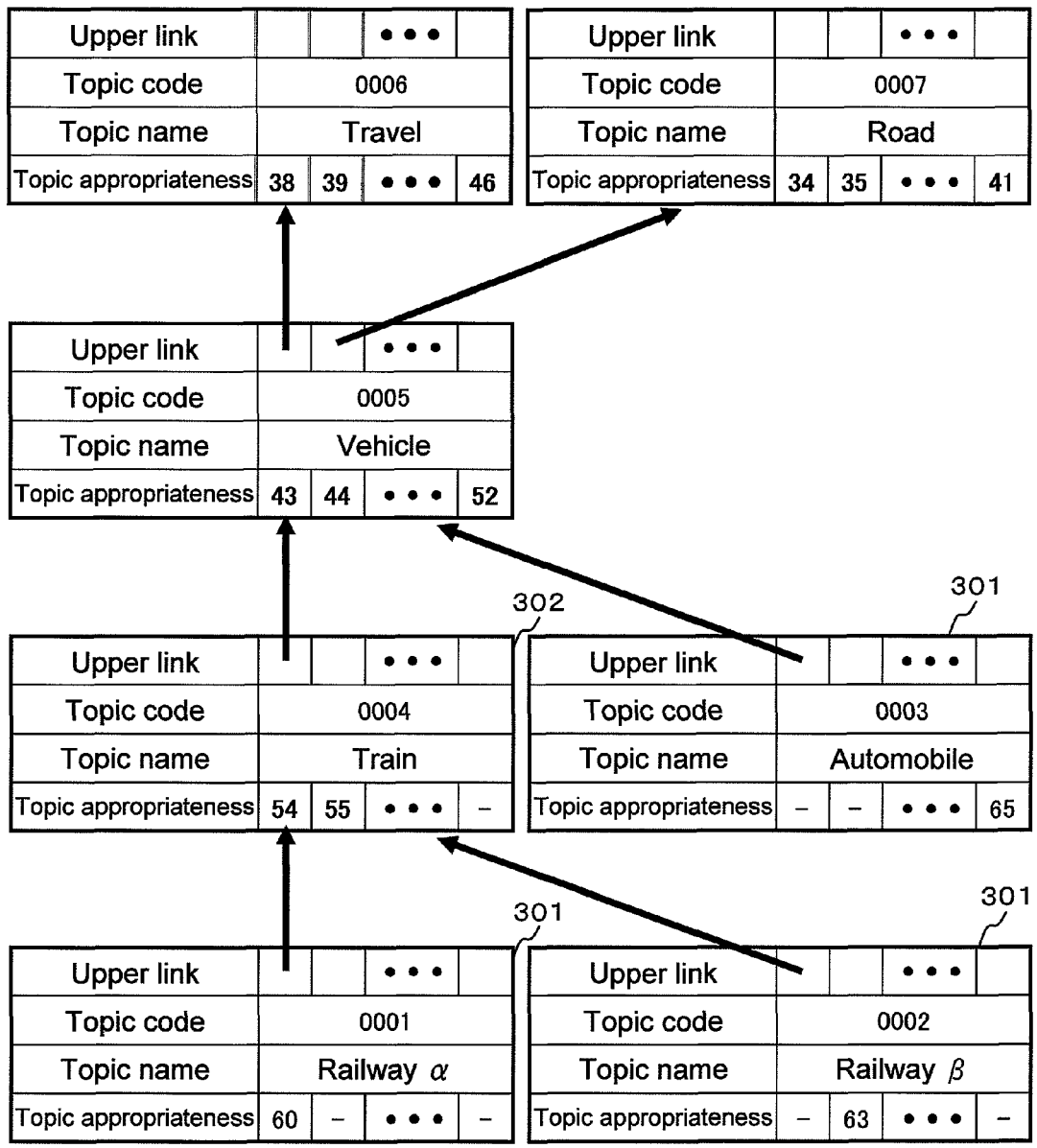
FIG. 3 shows expansion of topic nodes in the first embodiment.

The topic node integration unit 104 integrates the topic node set for the user of the device 100 with a topic node set for another user participating in the same communication, which has been received via the communication unit 111. More specifically, when the topic node sets for the plurality of users include topic nodes with the same topic name, which corresponds to meta information, the topic node integration unit 104 integrates the topic nodes with the same topic name into a single topic node to generate an integrated topic node 301 (FIG. 3). A new topic code is assigned to the integrated topic node. The topic appropriateness values corresponding to the plurality of users calculated for this topic name are then stored sequentially into the "topic appropriateness" field of the integrated topic node. Throughout all the topic nodes, the topic appropriateness values corresponding to the plurality of users are stored at the same slot positions that are uniquely allocated to the individual users.

The topic node expansion unit 105 receives a set of integrated topic nodes input from the topic node integration unit 104, and expands each integrated topic node included in the integrated topic node set.

More specifically, the topic node expansion unit 105 searches for an item of relevant information that is relevant to the item of meta information stored in the "topic name" field in the integrated topic node using relevant information dictionaries including a thesaurus, a dictionary of synonyms, and a dictionary of related words, which are stored in the relevant information dictionary storage unit 106. When obtaining the item of relevant information, the topic node expansion unit 105 then newly generates a topic node storing the obtained item of relevant information as a topic name (hereafter referred to as an "expanded topic node"). The topic node expansion unit 105 then further obtains an item of relevant information that is relevant to the item of relevant information stored in the generated expanded topic node to further newly generate an expanded topic node. By repeating this process of obtaining an item of relevant information and newly generating an expanded topic node, the topic node expansion unit 105 expands the topic nodes.

The topic node expansion unit 105 links the generated topic nodes based on, for example, a semantic relationship between the item of meta information and the item of relevant information or between the items of relevant information, and stores information indicating the link into the "upper link" field of each topic node. The topic node expansion unit 105 further calculates topic appropriateness values for an upper topic node by lowering the topic appropriateness values for the lower topic node based on the distance of the link between the topic nodes according to dictionary definitions or based on the semantic distance of the link, and stores the calculated topic appropriateness values into the corresponding "topic appropriateness" fields.

A process for generating expanded topic nodes performed by the topic node expansion unit 105 will now be described in more detail with reference to FIG. 3.

In this example, expanded topic nodes are generated from three integrated topic nodes: an integrated topic node 301 having the topic code "0001", the topic name "railway α", and the topic appropriateness "60" in the slot allocated to the first participant user; an integrated topic node 301 having the topic code "0002", the topic name "railway β", and the topic appropriateness "6362" in the slot allocated to the second participant; and an integrated topic node 301 having the topic code "0003", the topic name "automobile", and the topic appropriateness "65" in the slot allocated to the last participant According to dictionary definitions, a train constitutes a broader concept than a specific railway. Thus, an expanded topic node 302 having the topic name "train" is first newly generated. The expanded topic node 302 having the topic name "train" is then linked as an upper node of the topic nodes having the topic names "railway α" and "railway β". When the link is formed between these topic nodes, the topic appropriateness value corresponding to the first participant is transferred from the integrated topic node "railway α" to the topic node "train", and the topic appropriateness value corresponding to the second participant is transferred from the integrated topic node "railway β" to the topic node "train".

Figure 4:
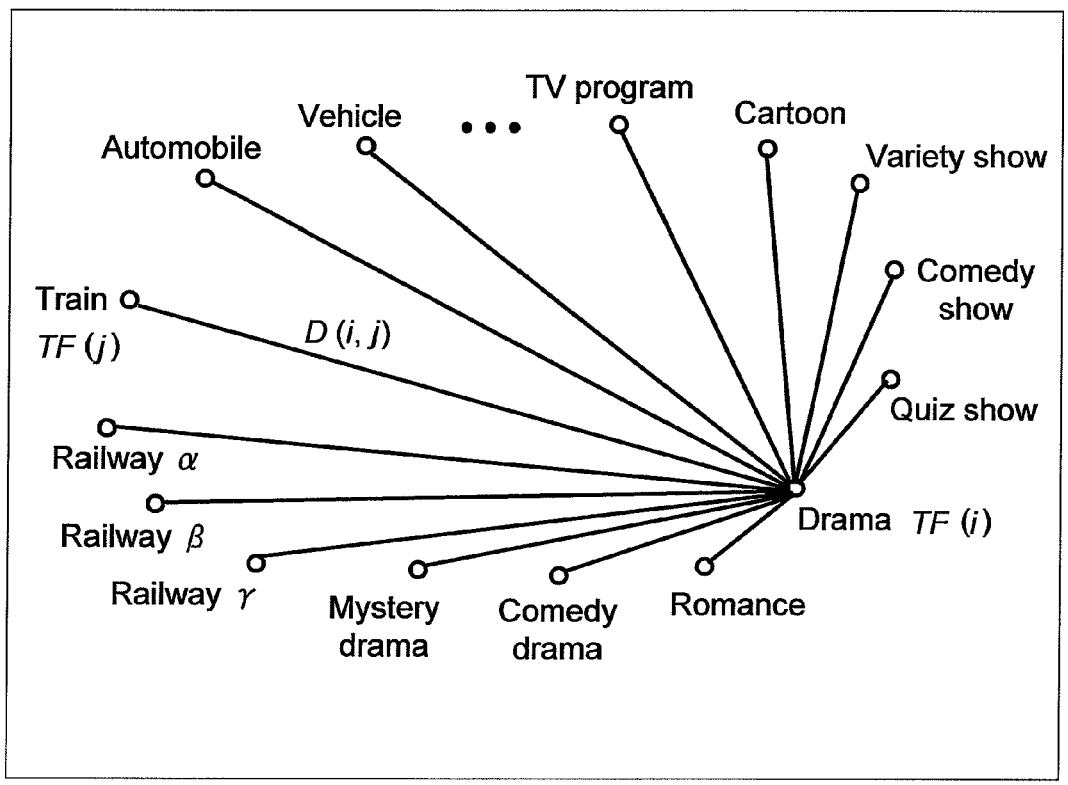
FIG. 4 shows inter-item distances used in the first embodiment.

A calculation method used by the topic node expansion unit 105 to calculate topic appropriateness values will now be described with reference to FIG. 4. In this example, a topic appropriateness value TF(i) for an item "drama" (where i=drama) is calculated. The figure shows other items of meta information including "quiz show", "comedy show", "variety show", etc. These items of meta information have been determined to have a semantic relationship falling within a predetermined range with the item "drama" according to definitions of relevant information dictionaries including a thesaurus, a dictionary of synonyms, and a dictionary of related words. The relationship determined to fall within the predetermined range may be, for example, the relationship of a broader concept and a narrower concept. In FIG. 4, D(i, j) (where i=drama) indicates an inter-item distance between each item of meta information j and the item of relevant information "drama". The inter-item distance is more specifically a length of a line connecting each item of meta information j and the item of relevant information "drama". A shorter inter-item distance D indicates a closer relevance between the two items of information, and a longer inter-item distance D indicates a more distant relevance between the two items of information. In this manner, the inter-item distance D is calculated based on the degree of relevance between the items of information according to dictionary definitions. Using the variables described above, the topic appropriateness value TF(i) (where i=drama) is written as the following formula using the topic appropriateness value TF(j) for one or more items of information j:

$$TF(i) = \sum_{j=1}^{n} \frac{TF(j)}{(D(i, j) + 1)^2}$$

where TF(i) is the topic appropriateness value for the item i,

D(i, j) is the inter-item distance between the item i and the item j, and

TF(j) is the topic appropriateness value for the item j.

The topic appropriateness value is transferred only from a topic node with a narrower concept to a topic node with a broader concept, and is not transferred in the opposite way. The topic nodes are linked to one another by transferring the topic appropriateness value under this condition. FIG. 3 shows an example of the resulting link relationship.

In the above formula, the topic appropriateness value TF(i) is calculated by summing the topic appropriateness values TF(j) for a plurality of topic nodes with a narrower concept than the target topic node after reducing each of these topic appropriateness values TF(j) by the inter-item distance D. However, the calculation method for the topic appropriateness value TF(i) should not be limited to this method. For example, the topic appropriateness value TF(i) may be calculated by using a representative value of the topic appropriateness values TF(j), such as a mean value, a median value, or a highest value of the topic appropriateness values TF(j), instead of summing the reduced topic appropriateness values TF(j).

The common-topic-candidate extraction unit 107 shown in FIG. 1 then obtains a set of topic nodes expanded by the topic node expansion unit 105. As described above, each topic node included in the obtained topic node set stores the topic appropriateness values corresponding to the plurality of users participating in the communication. The common-topic-candidate extraction unit 107 calculates a level of common interest (common topic level) in a manner that the score of the common topic level will be higher as the mean value of the topic appropriateness values stored in the topic node is larger and the variance of the topic appropriateness values is smaller. The common-topic-candidate extraction unit 107 then extracts common topic candidates in the order of higher common topic levels.

Figure 5:
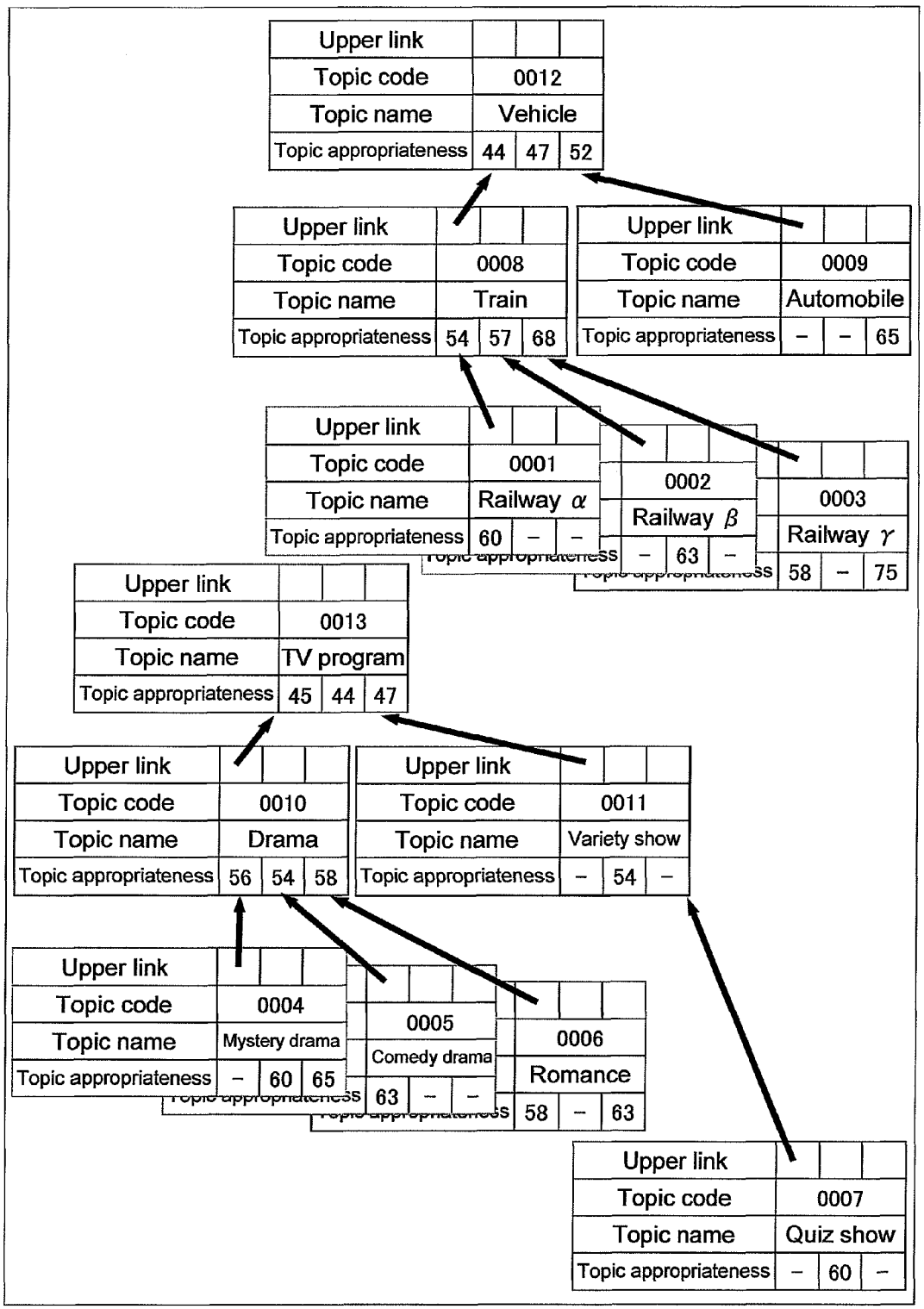
FIG. 5 shows a process for expanding topic nodes to extract common topic candidates in the first embodiment.

FIG. 5 shows a process for expanding topic nodes to extract common topic candidates for users A, B, and C participating in the communication. The user A (of the device 100) has pieces of content that can be named as "railway α", "railway γ", "comedy drama", and "romance". The participant B has pieces of content that can be named as "railway β", "mystery drama", and "quiz show". The participant C has pieces of content that can be named as "railway γ", "automobile", "romance" and "mystery drama". The topic appropriateness values calculated for these items are transferred into the "topic appropriateness" field in the corresponding topic nodes "train", "drama", "variety show", "vehicle", and "TV program".

A common topic level T(i) for a topic node i is written as the following formula using a mean value E(i) and a sample variance V(i) of topic appropriateness values corresponding to the users calculated for the topic node i:

$$T(i) = \frac{E(i)}{V(i) + 1}$$

where T(i) is a common topic level for the topic node i,
E(i) is a mean value of topic appropriateness values calculated for the topic node i, and
V(i) is a sample variance of topic appropriateness values calculated for the topic node i.

For the topic node "train" shown in FIG. 5, for example, the common topic level T(train) is calculated as 1.60 using E(train)=59.7 and V(train)=36.2. For the topic node "drama", the common topic level T(drama) is calculated as 15.3 using E(drama)=56.0 and V(drama)=2.67. In this case, the topic "drama" can be determined as a common topic candidate having a higher level than the topic "train". In this manner, the common topic level is calculated for each of all topic nodes, and common topic candidates are extracted based on the common topic level calculated for each topic node.

The common-topic-candidate display unit 108 shown in FIG. 1 then obtains common topic candidates extracted by the common-topic-candidate extraction unit 107. The common-topic-candidate display unit 108 shown in FIG. 1 displays the obtained common topic candidates on a display unit of the communication assistance device 100 in an easily understandable manner to the user.

Figure 6:
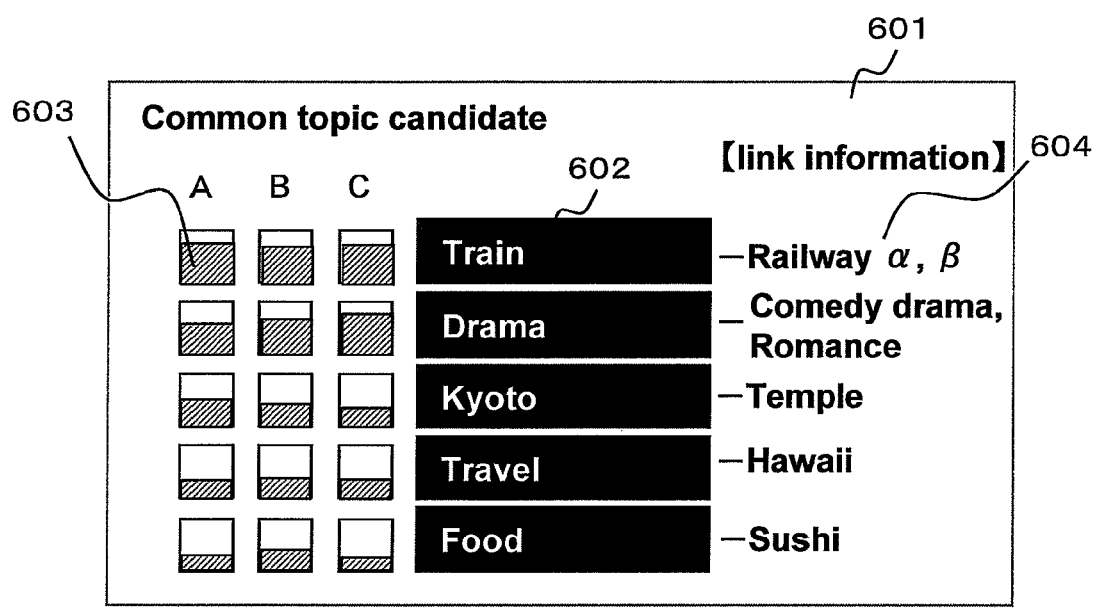
FIG. 6 shows a display method of common topic candidates in the first embodiment.

FIG. 6 shows an example of the display method of common topic candidates. In this display example, common topic candidates are listed in the order of higher common topic levels. In FIG. 6, the common topic candidates are displayed in a display area 601. The display area 601 includes a common-topic-candidate list display section 602, a topic appropriateness display section 603, and a link information display section 604.

In the common-topic-candidate list display section 602, the common topic candidates are arranged sequentially from top in the order of higher common topic levels. The number of topic candidates displayed in the common-topic-candidate list display section 602 may be fixed or may be set variably by the user. When the number of extracted common topic candidates exceeds the number of common topic candidates that can be displayed within one screen, the display may be scrolled to show the common topic candidates. In the topic appropriateness display section 603, the topic appropriateness corresponding to all users participating in the communication is displayed for every displayed common topic candidate. The topic appropriateness may be displayed using graphs representing the topic appropriateness values as shown in FIG. 6, or may be displayed using actual topic appropriateness values or normalized values of the topic appropriateness values. This display section enables the user to obtain the interest level of each participant user for the displayed common topic candidates. The link information display section 604 displays pieces of content belonging to the user having meta information to which the displayed common topic candidates are linked as well as having a high degree of relevance to the displayed common topic candidates. This display section enables the user to obtain detailed information about the displayed common topic candidates, or specifically, for example, enables the user to find out which pieces of content belonging to the user are relevant to each of the displayed common topic candidates.

Eventually, the topic/content sharing unit 109 shown in FIG. 1 reads, from the content storage unit 101, a piece of content belonging to the user corresponding to a common topic candidate selectively input by the user, and distributes the read piece of content to all users participating in the communication via the communication unit 111. More specifically, the user selects, using the selective input unit 110, a topic node corresponding to a common topic candidate from the common topic candidates that are displayed on the screen by the common-topic-candidate display unit 108. For every selection of such a topic node, a piece of content belonging to the user that is linked to the selected topic node is distributed. In this manner, the topic/content sharing unit 109 controls pieces of content to be shared by the plurality of users.

Figure 7:
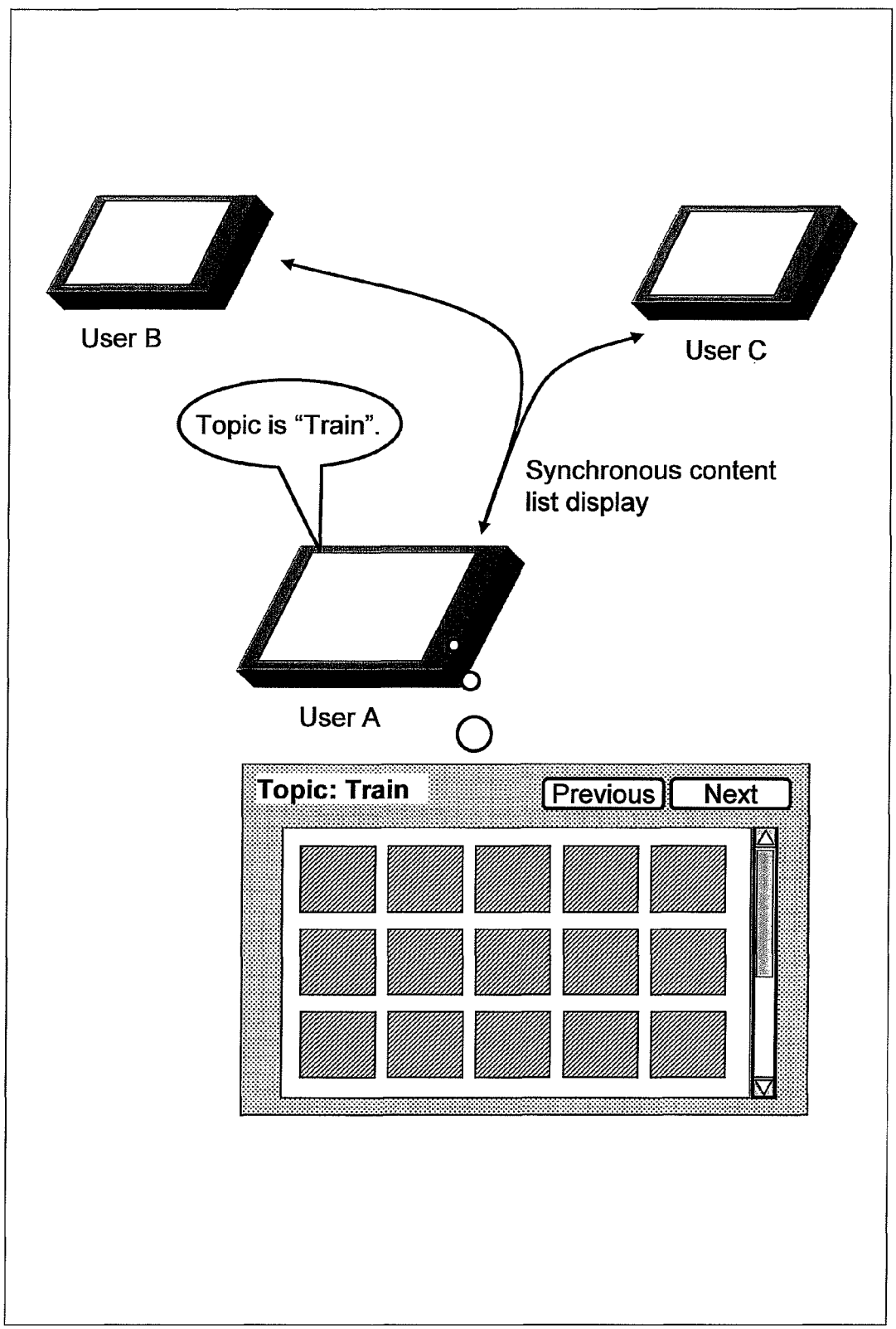
FIG. 7 shows sharing of content by a plurality of users in the first embodiment.

FIG. 7 shows an example of content sharing in which the user A selects and inputs the topic "train" from the displayed common topic candidates, and pieces of content relevant to the topic "train" are shared with other users participating in the communication. When the user A participating in the communication selects the topic node "train" from the common topic candidates, pieces of content belonging to the user A relevant to the topic "train" are distributed to the other participant users B and C. The user A also receives pieces of content belonging to the users B and C relevant to the topic "train". The pieces of content relevant to the topic "train" that are transmitted and received among the users are displayed, for example, as a list on the display screen of the communication assistance device 100 of the user A. The display screen of the communication assistance device 100 may be switched from the common topic candidate display screen to this content list display screen.

In this manner, the users A, B, and C can communicate with one another actively on the topic "train" while viewing the shared pieces of content relevant to the topic "train".

1.3 Advantageous Effects of First Embodiment

The communication assistance device 100 of the first embodiment enables each participant user who even lacks knowledge about other users' areas of interest to extract a topic from an area of common interest based on meta information attached to each piece of content. Also, the communication assistance device 100 newly calculates an area of interest common to the user of the communication assistance device 100 and other users by expanding each topic, and displays topics of common interest in the order of higher interest levels. This structure enables the user to easily determine which topic is likely to serve as a good topic on which the user can smoothly communicate with other users.

The communication assistance device 100 of the first embodiment also enables pieces of content belonging to a plurality of users to be shared by the users, and further displays common topics extracted based on meta information about the shared pieces of content together with the interest level of each participant user for the displayed common topics, as well as information indicating relevance of the displayed common topics to pieces of content belonging to the user of the communication assistance device 100. This structure enables each user to easily find a good topic of communication with other users between whom common ground is difficult to find, such as when communicating with new people, and also enables pieces of content corresponding to the topic to be shared by the users. This structure enables the users to communicate with one another more smoothly and actively.

1.4 Modifications 1.4.1 Modifications Associated with Obtaining Relevant Information In the above embodiment, the topic node expansion unit 105 uses relevant information dictionaries to search and obtain items of relevant information when generating an expanded topic node. When no relevant information dictionaries are available, or when the relevant information dictionaries fail to cover the degree of relevance between an item of meta information and an item of relevant information or between items of relevant information, the degree of relevance may be calculated based on the co-occurrence probability of the item of meta information and the item of relevant information with respect to the corresponding piece of content or the co-occurrence frequency of the items of relevant information with respect to the corresponding piece of content.

The inter-item distance D may also be calculated based on the co-occurrence probability or the co-occurrence frequency of the item of meta information and the item of relevant information with respect to the corresponding piece of content or the co-occurrence frequency of the items of relevant information with respect to the corresponding piece of content.

1.4.2 Modifications Associated with Display Method

In the above embodiment, the common topic candidates are displayed by the common-topic-candidate display unit 108 using the display method shown in FIG. 6. Alternatively, other display methods, which are for example shown in FIGS. 8 and 9, may be used.

(1)

Figure 8:
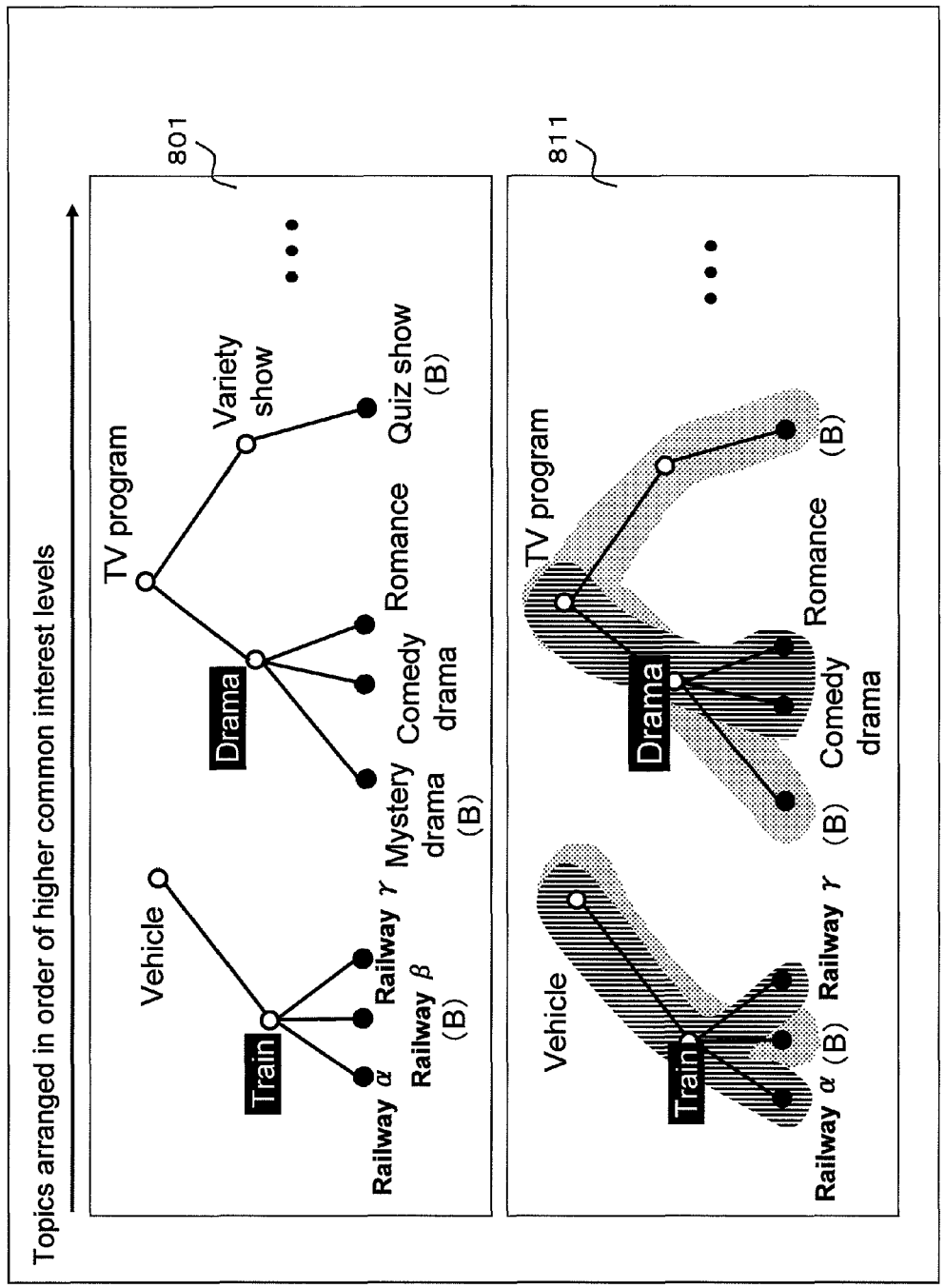
FIG. 8 shows another display method of common topic candidates in the first embodiment.

With the display method shown in FIG. 8, the tree structure of each topic node expanded by the topic node expansion unit 105 is displayed. With this method, tree structures representing the common topic candidates are extracted in the order of higher common topic interest levels, and are arranged in the order of extraction. When, for example, the users A and B communicate with each other, common topic candidates shown in FIG. 8 are displayed on the display unit included in the communication assistance device 100 of the user A. This display includes topics of interest for the user B, who is a communication partner of the user A.

The terminal device of the user A may have a display example 801, which indicates that the user B, who is a communication partner of the user A, has a high interest level for the topics "railway β", "mystery drama", and "quiz show".

The terminal device of the user A may alternatively have a display example 811, in which the specific topic names such as "railway β" are not displayed and only the name or the code of the user B is displayed. In this display, a common topic candidate with a high common topic level may be differentiated by inverted display, by using characters colored differently, characters with a different shade of gray, thickness, or size, by labeling with an icon, or by blinking display. The shade of gray, thickness, and size of the characters or the interval of blinking may be changed in proportion to the interest level of each common topic candidate, may be changed exponentially, or may be changed in stages using at least one predetermined threshold. The threshold may be variable according to different situations such as participant users or the time at which the communication is performed.

In FIG. 8, common topic candidates arranged more to the left have higher common topic levels. The arrangement direction of the common topic candidates may be fixed or may be set variably by the user. In the display example 811, the distribution of topic appropriateness values corresponding to the user A is displayed in an overlapping manner with the distribution of topic appropriateness values corresponding to the user B, who is a communication partner of the user A. In this case, each topic appropriateness value distribution may be displayed with gradation that is darker around topic nodes having a higher topic appropriateness value and lighter around topic nodes having a lower topic appropriateness value.

(2)

Figure 9:
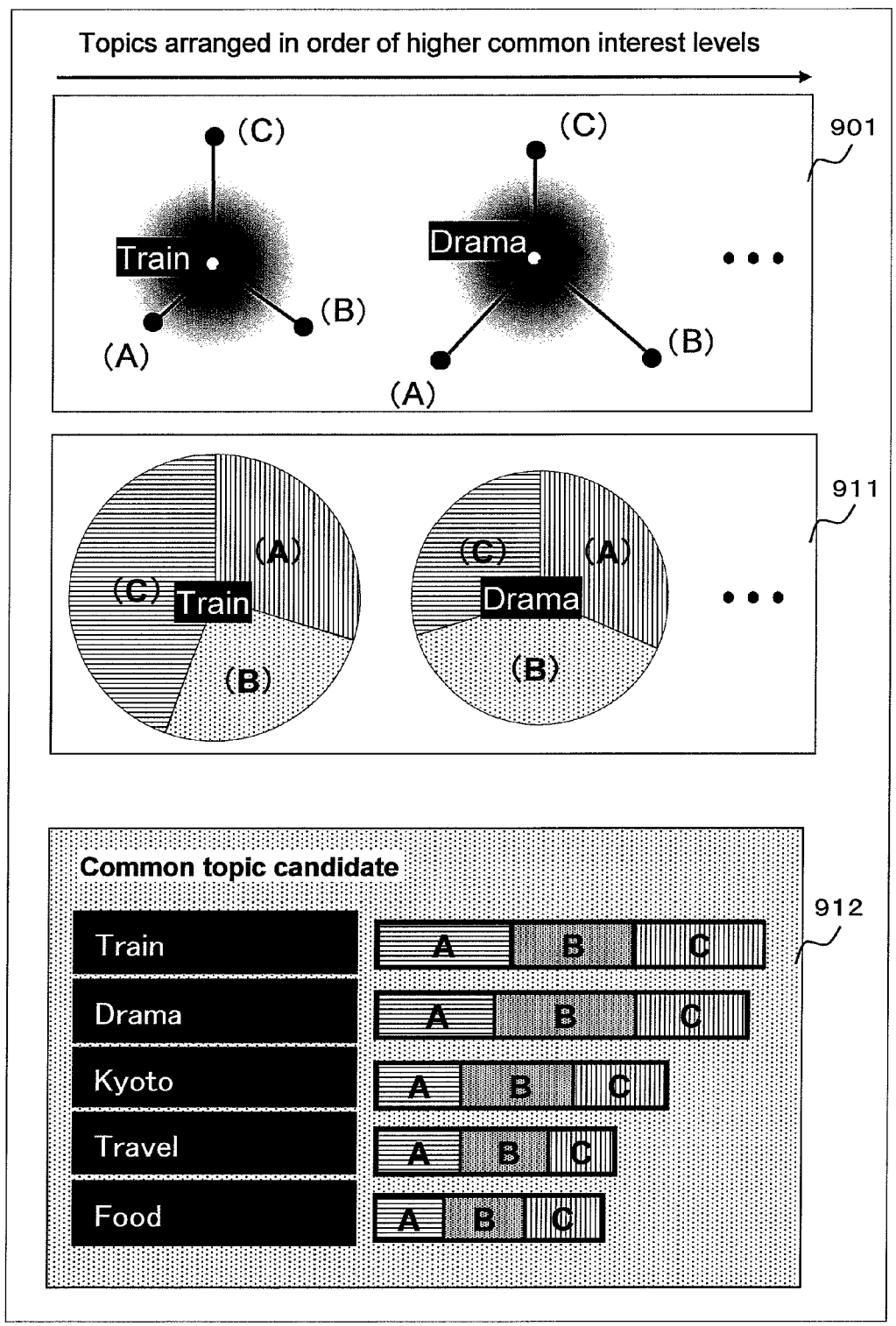
FIG. 9 shows still another display method of common topic candidates in the first embodiment.

With the display method shown in FIG. 9, the common topic level of each common topic candidate and the topic appropriateness value corresponding to each user participating in the communication are displayed in a visually easily understandable manner.

In a display example 901, the participant users are arranged in a manner that a user with a higher topic appropriateness value for a common topic candidate displayed in the center is closer to the center and a user with a lower topic appropriateness value for the common topic candidate is more distant from the center. For the common topic candidate "train", the participant user A has the highest topic appropriateness value, whereas the participant user C has the lowest topic appropriateness value.

In a display example 911, the relative proportion of the topic appropriateness value of each participant user to a common topic candidate is shown using a pie chart. A larger area of each pie chart indicates that the corresponding user has a higher topic appropriateness value relative to other participant users. For the common topic candidate "train", the participant user C has the highest topic appropriateness value, whereas the participant user B has the lowest topic appropriateness value. The pie charts may have a fixed radius for all common topic candidates, or may have a larger radius as the corresponding common topic candidate has a higher common topic level.

Although common topic candidates arranged more to the left have higher common topic levels in FIG. 9 in the same manner as in FIG. 8, the arrangement direction of the common topic candidates may be fixed or may be set variably by the user.

In a display example 912, the topic appropriateness value of each participant user is shown using a bar graph for each common topic candidate included in the displayed common topic candidate list. The total length of each bar graph indicates the common topic level of the corresponding common topic candidate, and the elements of each bar graph indicate relative proportions of the topic appropriateness values of the participant users to the corresponding common topic candidate. The elements of each bar graph may be labeled with names of the corresponding participant users or with icons indicating the corresponding participant users, or may be displayed using different colors.

1.4.3 Modifications Associated with Common Topic Candidate Calculation

In the above embodiment, the common topic level is calculated using the mean value and the sample variance of topic appropriateness values corresponding to the user for each topic node. Alternatively, the common topic level may be calculated using an unbiased variance or a standard deviation of the topic appropriateness values.

2. Second Embodiment

Figure 10:
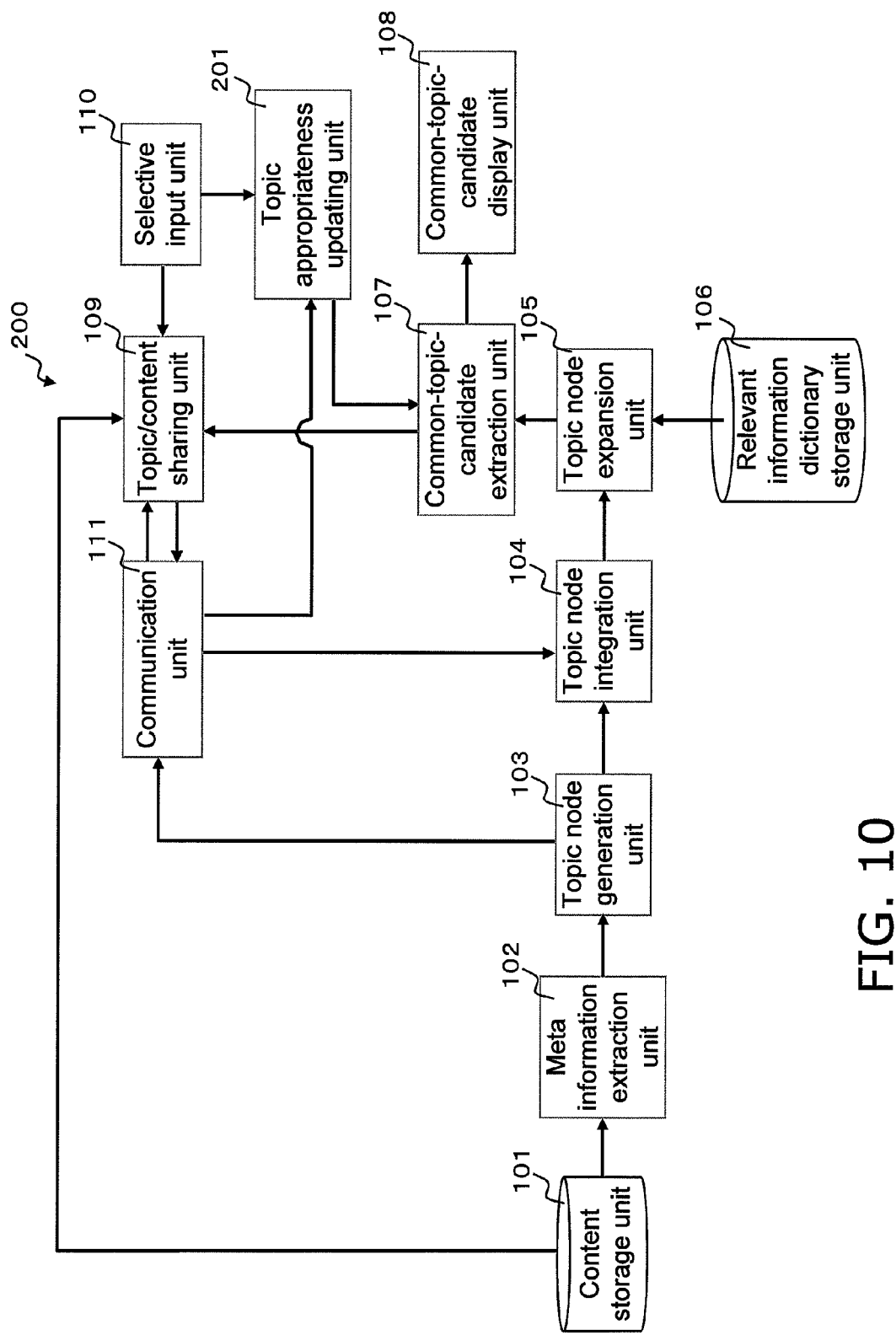
FIG. 10 is a schematic block diagram of a communication assistance device according to a second embodiment of the present invention.

FIG. 10 is a block diagram of a communication assistance device 200 according to a second embodiment of the present invention. In FIG. 10, the components that are the same as the components shown in FIG. 1 are given the same reference numerals as those components and will not be described in detail.

In FIG. 10, the communication assistance device 200 differs from the communication assistance device 100 of the first embodiment in that the device 200 additionally includes a topic appropriateness updating unit 201.

The topic appropriateness updating unit 201 recalculates the topic appropriateness value of a common topic candidate that is selected and input by a user participating in the communication, among common topic candidates displayed on the screen by the common-topic-candidate display unit 108, and outputs the calculation result to the common-topic-candidate extraction unit 107.

More specifically, the user of the communication assistance device 200 selectively inputs one of the common topic candidates via the selective input unit 110. The selected common topic candidate is then input into the topic appropriateness updating unit 201. A common topic candidate selected and input by another user participating in the communication is input into the communication unit 111 via the topic/content sharing unit 109, and is input into the topic appropriateness updating unit 201.

The topic appropriateness updating unit 201 updates the topic appropriateness value corresponding to each user for the topic node corresponding to the selected and input common topic candidate and topic nodes linked to that topic node by increasing the topic appropriateness value corresponding to each user with a predetermined ratio.

The common-topic-candidate extraction unit 107 recalculates the common topic level based on the topic appropriateness values updated by the topic appropriateness updating unit 201, and extracts common topic candidates again. The common-topic-candidate display unit 108 then displays the common topic candidates that are extracted again by the common-topic-candidate extraction unit 107. The other processing is the same as the processing described in the first embodiment.

This structure enables the user to always easily find an optimum common topic accordingly as the communication proceeds, and may, for example, increase the likelihood that a topic initially having a low common interest level will be ranked high among the displayed common topic candidates after the communication proceeds. As a result, the communication assistance device with this structure enables smooth and active communication to be continued.

3. Other Embodiments

The present invention is applicable to assisting communication between users in a virtual community on the network. In this case, the communication assistance device of the present invention should not necessarily be a mobile terminal, and may be a stay-at-home network terminal, such as a personal computer.

The communication assistance device of the present invention may not be a single terminal device, and may be formed by a plurality of devices. For example, the common-topic-candidate display unit 108 and the selective input unit 110 may be arranged in a terminal device of a user, whereas the meta information extraction unit 102, the topic node generation unit 103, the topic node integration unit 104, the topic node expansion unit 105, the common-topic-candidate extraction unit 107, and the topic/content sharing unit 109, and the topic appropriateness updating unit 201 of the second embodiment may be arranged in another device such as a server that is accessible by the terminal device.

The components of the communication assistance device of the above embodiments that are implemented by executing programs may be partially formed using hardware.

The present invention is implementable not only as a device or a system but also as a method. The method of the present invention may be partially or entirely implemented using software. Software products that enable a computer to implement such software are also included within the technical scope of the present invention.

INDUSTRIAL APPLICABILITY

The present invention is applicable to a communication assistance device including a mobile AV terminal and a personal computer that generate, accumulate, and use pieces of personal content, such as a mobile telephone or a digital still camera, and to a communication assistance method and a communication assistance program.

EXPLANATION OF REFERENCE 100 communication assistance device
101 content storage unit
102 meta information extraction unit
103 topic node generation unit
104 topic node integration unit (integrated topic node generation unit)
105 topic node expansion unit
106 relevant information dictionary storage unit
107 common-topic-candidate extraction unit
108 common-topic-candidate display unit (display unit)
109 topic/content sharing unit
110 selective input unit (input unit)
111 communication unit
200 communication assistance device
201 topic appropriateness updating unit

What is claimed is:

1. A communication assistance device, comprising:
a meta information extraction unit that extracts an item of meta information from a piece of content belonging to a user;
a topic node generation unit that calculates a topic appropriateness value based on the number of pieces of content from which the item of meta information has been extracted or the number of times a piece of content including the item of meta information has been viewed, and generates a first topic node including the item of meta information and the topic appropriateness value;
an integrated topic node generation unit that obtains the first topic node and other first topic nodes for a plurality of users, and generates, for every item of meta information, an integrated topic node storing the topic appropriateness value corresponding to each of the plurality of users;
a topic node expansion unit that generates an expanded topic node that is a new topic node based on the item of meta information corresponding to the integrated topic node;
a common-topic-candidate extraction unit that extracts at least one topic candidate between the plurality of users from the integrated topic node or from the expanded topic node;
a display unit that displays the at least one common topic candidate; and an input unit that receives input of the at least one common topic candidate displayed, wherein the topic node expansion unit:

searches for an item of relevant information that has a semantic relationship falling within a predetermined range with the item of meta information corresponding to at least one integrated topic node;

generates, after obtaining the item of relevant information, the expanded topic node for the obtained item of relevant information, the expanded topic node being linked to the at least one integrated topic node;

lowers the topic appropriateness value corresponding to each of the plurality of users calculated for the item of meta information in accordance with an inter-item distance between the obtained item of relevant information and the item of meta information corresponding to the integrated topic node to calculate another topic appropriateness value corresponding to each of the plurality of users for the obtained item of relevant information;

stores the another topic appropriateness value corresponding to each of the plurality of users calculated for the obtained item of relevant information into the expanded topic node; and based on another item of relevant information obtained for the generated expanded topic node, further generates a new expanded topic node, and wherein the common-topic-candidate extraction unit:

calculates a common topic level in accordance with a difference between the topic appropriateness values corresponding to the plurality of users or a ratio of the topic appropriateness values corresponding to the plurality of users that have been calculated for the item of meta information corresponding to the integrated topic node or for the item of relevant information corresponding to the expanded topic node; and extracts the at least one common topic candidate in accordance with the common topic level.

2. The communication assistance device according to claim 1, wherein the topic node expansion unit calculates the topic appropriateness value TF(i) for the item of relevant information using the formula below:

$$TF(i) = \sum_{j=1}^{n} \frac{TF(j)}{(D(i, j) + 1)^2}$$

where TF(j) is a topic appropriateness value corresponding to each of the plurality of users for the item of meta information or for the item of relevant information that is to be lowered, and D(i, j) is the inter-item distance.

3. The communication assistance device according to claim 1, wherein the common-topic-candidate extraction unit calculates the common topic level T(i) using the formula below:

$$T(i) = \frac{E(i)}{V(i) + 1}$$

where E(i) is a mean value of the topic appropriateness values corresponding to the plurality of users, and V(i) is a variance of the topic appropriateness values corresponding to the plurality of users.

4. The communication assistance device according to claim 1, wherein the display unit displays, for each of the at least one common topic candidate, a distribution of the topic appropriateness values corresponding to the plurality of users and the item of meta information of the first topic node for which the at least one common topic candidate has been extracted.

5. The communication assistance device according to claim 1, further comprising:

a topic/content sharing unit that extracts a piece of content including the item of meta information corresponding to the integrated topic node from which the input common topic candidate has been extracted, and controls the extracted piece of content to be shared by the plurality of users.

6. The communication assistance device according to claim 1, wherein the topic node expansion unit further calculates the inter-item distance between the item of meta information and the item of relevant information or between the items of relevant information based on a semantic relation between the items defined in a dictionary.

7. The communication assistance device according to claim 1, wherein the topic node expansion unit further calculates the inter-item distance between the item of meta information and the item of relevant information or between the items of relevant information based on a co-occurrence frequency of the items with respect to the piece of content.

8. The communication assistance device according to claim 1, wherein the display unit displays a distribution of the topic appropriateness values corresponding to the plurality of users for the at least one common topic candidate using at least one of a character, a numerical value, a symbol, and a graph.

9. The communication assistance device according to claim 1, wherein the display unit displays a distribution of the topic appropriateness values corresponding the plurality of users for the at least one common topic candidate by changing at least one of a component or a shade of gray of a displayed color, a display size, and a display shape.

10. The communication assistance device according to claim 1, wherein the display unit displays the common topic candidates in a list or using a graph in an order of higher common topic levels.

11. The communication assistance device according to claim 1, further comprising:

a topic appropriateness updating unit that recalculates a further topic appropriateness value for the at least one common topic candidate input by the input unit.

12. A communication assistance method, comprising:

(a) extracting an item of meta information from a piece of content belonging to a user;

(b) calculating a topic appropriateness value based on the number of pieces of content from which the item of meta information has been extracted or the number of times a piece of content including the item of meta information has been viewed, and generating a first topic node including the item of meta information and the topic appropriateness value;

(c) obtaining the first topic node and other first topic nodes for a plurality of users, and generating, for every item of meta information, an integrated topic node storing the topic appropriateness value corresponding to each of the plurality of users;

(d) generating an expanded topic node that is a new topic node based on the item of meta information corresponding to the integrated topic node;

(e) extracting at least one common topic candidate between the plurality of users from the integrated topic node or from the expanded topic node;

(f) displaying the at least one common topic candidate; and (g) receiving input of the at least one common topic candidate displayed, wherein the (d) includes:

(d-1) searching for an item of relevant information that has a semantic relationship falling within a predetermined range with the item of meta information corresponding to at least one integrated topic node;

(d-2) generating, after obtaining the item of relevant information, the expanded topic node for the obtained item of relevant information, the expanded topic node being linked to the at least one integrated topic node;

(d-3) lowering the topic appropriateness value corresponding to each of the plurality of users calculated for the item of meta information in accordance with an inter-item distance between the obtained item of relevant information and the item of meta information corresponding to the integrated topic node to calculate another topic appropriateness value corresponding to each of the plurality of users for the obtained item of relevant information;

(d-4) storing the another topic appropriateness value corresponding to each of the plurality of users calculated for the obtained item of relevant information; and (d-5) further generating a new expanded topic node based on another item of relevant information obtained for the generated expanded topic node, and wherein the (e) includes:

(e-1) calculating a common topic level in accordance with a difference between the topic appropriateness values corresponding to the plurality of users or a ratio of the topic appropriateness values corresponding to the plurality of users that have been calculated for the item of meta information corresponding to the integrated topic node or for the item of relevant information corresponding to the expanded topic node; and (e-2) extracting the at least one common topic candidate in accordance with the common topic level.

13. A communication assistance program for enabling a computer to implement:

(a) extracting an item of meta information from a piece of content belonging to a user;

(b) calculating a topic appropriateness value based on the number of pieces of content from which the item of meta information has been extracted or the number of times a piece of content including the item of meta information has been viewed, and generating a first topic node including the item of meta information and the topic appropriateness value;

(c) obtaining the first topic node and other first topic nodes for a plurality of users, and generating, for every item of meta information, an integrated topic node storing the topic appropriateness value corresponding to each of the plurality of users;

(d) generating an expanded topic node that is a new topic node based on the item of meta information corresponding to the integrated topic node;

(e) extracting at least one common topic candidate between the plurality of users from the integrated topic node or from the expanded topic node;

(f) displaying the at least one common topic candidate; and (g) receiving input of the at least one common topic candidate displayed, wherein the (d) includes:

(d-1) searching for an item of relevant information that has a semantic relationship falling within a predetermined range with the item of meta information corresponding to at least one integrated topic node;

(d-2) generating, after obtaining the item of relevant information, the expanded topic node for the obtained item of relevant information, the expanded topic node being linked to the at least one integrated topic node;

(d-3) lowering the topic appropriateness value corresponding to each of the plurality of users calculated for the item of meta information in accordance with an inter-item distance between the obtained item of relevant information and the item of meta information corresponding to the integrated topic node to calculate another topic appropriateness value corresponding to each of the plurality of users for the obtained item of relevant information;

(d-4) storing the another topic appropriateness value corresponding to each of the plurality of users calculated for the obtained item of relevant information; and (d-5) further generating a new expanded topic node based on another item of relevant information obtained for the generated expanded topic node, and wherein the (e) includes (e-1) calculating a common topic level in accordance with a difference between the topic appropriateness values corresponding to the plurality of users or a ratio of the topic appropriateness values corresponding to the plurality of users that have been calculated for the item of meta information corresponding to the integrated topic node or for the item of relevant information corresponding to the expanded topic node; and (e-2) extracting the at least one common topic candidate in accordance with the common topic level.

* * * * *